United States Patent [19]

Maus et al.

[11] Patent Number: 5,015,426
[45] Date of Patent: May 14, 1991

[54] PRECISION SINGLE CAVITY AND MULTICAVITY PLASTIC INJECTION MOLDING VIA AN ADAPTIVE MOLD PROCESS

[75] Inventors: Steven M. Maus, Osseo; George J. Galic, Columbia Heights, both of Minn.

[73] Assignee: Galic Maus Ventures, Columbia Heights, Minn.

[21] Appl. No.: 353,911

[22] Filed: May 18, 1989

[51] Int. Cl.⁵ .............................. B29C 45/56
[52] U.S. Cl. .................... 264/40.5; 264/2.2; 264/297.2; 264/328.7; 264/328.11; 425/141; 425/150; 425/555; 425/575
[58] Field of Search ............ 264/40.1, 40.5, 2.2, 264/328.7, 328.8, 328.9, 328.11, 297.2; 425/140, 141, 149, 150, 808, 810, 555, 588, 574, 575

[56] References Cited

U.S. PATENT DOCUMENTS

| | | | |
|---|---|---|---|
| 2,443,826 | 6/1948 | Johnson | 425/808 |
| 4,573,903 | 3/1986 | Boudet et al. | 425/808 |
| 4,715,804 | 12/1987 | Takahashi | 425/150 |
| 4,767,579 | 8/1988 | Buja et al. | 425/150 |
| 4,881,884 | 11/1989 | De'Ath | 425/556 |

FOREIGN PATENT DOCUMENTS

| | | | |
|---|---|---|---|
| 0128722 | 12/1984 | European Pat. Off. | |
| 0130769 | 1/1985 | European Pat. Off. | |
| 61-125820 | 6/1986 | Japan | 425/808 |
| 61-192532 | 8/1986 | Japan | 425/150 |

OTHER PUBLICATIONS

Society of Plastics Engineers ANTEC '88 published paper entitled: "Transfer Point Control Comparison Between Mold Parting Line and Standard Strategies", by J. Wenskus of Eastman Kodak.
Society of Plastics Engineers ANTEC '88 published paper entitled: "PC-Based Monitoring of Melt State Variables for Predicting Injection Molded Part Quality" by Applicants.
Society of Manufacturing Engineers 1986 published paper entitled: "Intelligent Molds for Automatic Injection Molding" by R. Groleau of Transal.

Primary Examiner—Jill L. Heitbrink

[57] ABSTRACT

In critical surface quality plastic molded articles, especially in optical lenses and disks, an "adaptive" mold cavity is used to automatically control melt pressure and densification during mold packing to within a predetermined range of acceptable values, while normal cycle-to-cycle molding process variations produce a corresponding minor but acceptable change in the molded-part thickness. In multicavity "adaptive" moldsets, permissible cavity-to-cavity imbalance without an overfilled cavity flashing at the parting line is increased. A resilient member (mechanical steel spring or elastomer or hydraulic cylinder) is interposed between the part-forming mold insert surface and the associated clamp plate for that half of the moldset. When the mold is initially closed, a separation distance between the A and B mold insert is less than the molded product specification's minimum acceptable part thickness. Sufficient volume of injected plastic melt must enter the adaptive mold cavity to cause at least some minimum spring deflection, and thus assure that the resulting molded-part thickness will be somewhere between minimum and maximum thickness tolerances. At maximum acceptable volume of the injected melt, the resilient member is still incompletely compressed. This A-B mold insert second separation distance must also be less than or equal to the maximum acceptable molded-part thickness. The adaptive cavity's proper self-adjusting performance may be verified by an LVDT.

17 Claims, 2 Drawing Sheets

PRECISION SINGLE CAVITY AND MULTICAVITY PLASTIC INJECTION MOLDING VIA AN ADAPTIVE MOLD PROCESS

FIELD OF THE INVENTION

This invention relates to a process for controlling the degree of internal plastic packing in a single cavity or multicavity injection moldset by means of an "adaptive" mold cavity, while also minimizing the wellknown problems of cavity-to-cavity imbalance in multicavity molds.

BACKGROUND OF THE INVENTION

A conventional moldset for plastic injection molding is constructed of high-strength metals and most specifically tool steels having a compressive yield strength at 0.5% elongation exceeding 100,000 psi. The mold cavity itself is defined by a moldset parting line which opens and closes with each mold cycle, and on each side of the parting line is at least one part-forming mold insert surface, which in turn, is supported by these suitably-rigid moldset members so that very high force must be exerted to produce even ten millionths of an inch in deflected distance relative to the mold clamp plate, when distances are measured at constant temperature. In this manner, a rigid moldset is used to form a closed mold cavity of comparatively fixed volume. From this mold is produced a molded part which must meet a product specification for thickness, with usual variation of at least + or −0.002" being acceptable (commonly, far more).

For conventional injection molding, such a conventional moldset is quite satisfactory, as long as sufficient mold-clamping force is exerted by the injection molding machine to overcome the pressure exerted on the part-forming surfaces by the injected plastic melt, and at least enough injected plastic melt volume to at least initially fill the closed mold cavity.

A "short shot" would be defined as an injected melt volume insufficient to at least fill out the cavity configuration, such that the end-of-flow perimeter of the molded part is visibly misshapen. "Flash" is defined as an excess of injected melt volume such that the mold-clamping force has been exceeded by the injected melt's pressure on the mold, so that plastic melt leakage into the parting line has visually occurred. By ordinary standards, a molder is said to have completed his job satisfactorily as long as he maintains his processing conditions somewhere between these "short shot" and "flash" condition boundaries.

However, with the continuing development of improved engineering plastics having much greater dimensional stability at elevated temperatures and under load (i.e., creep resistance), plastic has increasingly able to be competitive in very-high-precision manufactured parts which otherwise would have been made out of a precision machined metal or lapped glass. Such an example is computer hard disk drive media, wherein the disk substrate has been traditionally aluminum which is machined and lapped to extremely high tolerances and is now under competition from optical glass flats which are suitably lapped for even better micro-surface and planarity. Another example is in optical lenses which traditionally have been ground and polished glass.

These examples are part of a class of potential applications for molded plastic in competition to machined and/or lapped-metal or glass parts. The product tolerances in each case permit some variation in thickness from nominal (here, nominal=that central value, around which there is some defined range of also acceptable greater and lesser values, which are the "plus or minus" part of specification values) but are quite strict regarding imperfect surface quality or imprecise surface contour. For example, camera optical lenses must be true to their nominal radius of curvature within less than one wavelength of light and are typically checked by interferometric measurements for accuracy of surface contour. Surface RMS value is also measured in a fractional microns. In contrast, the acceptable variation from nominal thickness is at least + or −0.002 inch, orders of magnitude larger variation than is tolerable for surface contour deviation or roughness.

Similar tolerances exist for optical disk and even more stringent surface tolerance for magnetic-media hard disk substrate.

In each case, this higher priority for surface accuracy and macro-texture should dictate a correspondingly high concern over those factors which in plastic molding dictate the quality of molded-part-surface replication of the extremely-high-precision mold surfaces against which the molded plastic part is formed. However, even perfection in the mold surface does not by any means guarantee perfection in the corresponding plastic part made therefrom, since the degree of surface replication quality is well known to correlate extremely strongly with the mold packing parameter. Most specifically, the plastic must not be allowed to shrink away from the precision mold surface before the plastic has sufficiently cooled to fully replicate the surface detail and contour of the mold surface, and this can only be assured by putting the plastic melt under continuing pressure and this enforced densification compensates for the inevitable degree of thermal shrinkage of the plastic during its cooling process.

In recognition of this strong predictive correlation between mold packing and corresponding melt density and pressures, and resulting mold-part accuracy of surface contour and micro-finish, a greater need for monitoring and/or controlling the melt density and pressures within the filled mold cavity have become correspondingly important to this field of the present invention, since controlling these undesirable vatiations is much more difficult in multicavity molding vs. single cavity molding.

Johnson (U.S. Pat. No. 2,443,826 issued Jun. 22, 1948) teaches a lens molding apparatus with coiled steel compression springs whose function is to become compressed as the injected melt's pressure rises to its peak, then as cooling and shrinkage starts, the spring recovers and exerts pressure upon the plastic. It uses this apparatus to "form lenses of predetermined thickness", which is achieved by intentionally fully deflecting the dies (his (12) and (13)) till they reach his "stops {which} in this case are simply the annular bases of the sockets 14 and 15", which causes these relatively weak coil springs (his (17) and (18)) to be fully compressed. See column 2, lines 35–48.

However, there is no apparent concern for nor provision for preventing the spring from "bottoming out" (loaded so as to allow the rigid elements of the spring-loaded assembly to rest against each other, so that no further compressive displacement is possible regardless of the additional load). Once "bottomed out", the melt pressure is free to vary uncontrollably (which results in unpredictable mold packing, melt density variations, and corresponding variations in molded part's surface contour and microfinish), up to the point where the melt pressure is so high it overcomes the clamping force and flashes the mold. Nor does Johnson's apparatus recognize any value to any stiffer types of steel springs (since he is apparently unaware of any disadvantage to allowing his springs to bottom out), nor any alternatives to conventional metal springs at all, such as are taught by the present invention.

Furthermore, Johnson doesn't teach any means for measuring cavity melt pressure, spring load or deflection, nor any of the molded part's surface quality attributes. Never mentioned is any value in monitoring or correcting cavity imbalance nor compensating to prevent flash in a multicavity moldset, even though Johnson's illustration shows a 2-cavity mold. Nor does Johnson speak to the need to measure or control cavity melt pressure in order to assure the molded part's surface contour or microfinish.

The most primitive attempts achieve the latter objectives date back to the 1960's, by simply implanting a strain-gauge-type pressure transducer into a conventional moldset which forms a fixed volumetric cavity with rigidly supported part-forming mold inserts. This pressure transducer is placed in communication with the plastic melt at some point within the moldset, either in direct contact with the melt itself (i.e., implanted inside the mold cavity or in the runner and/or gate area leading into the mold cavity), or else to place such a transducer behind a movable tool steel pin or rod, which in turn is pressurized by its contact with the plastic melt (such as is the case for an ejector pin, placed in contact with the plastic runner and/or knockout tabs at the end-of-fill position on the molded plastic part itself).

An alternative method of monitoring in indirect fashion the cavity melt pressure is to implant at the parting line of the conventional moldset described above a proximity sensor, which resolves to millionths of an inch, to measure the tendency of A and B mold plates to separate at the parting line as the molding process cycle sequence moves from an empty mold to a filled mold to packing pressure at maximum and then dimishes as cooling and shrinkage take place. Its advantages are:

1. it is no longer a one-point measurement within the surfaces wetted by the plastic melt
2. it is comparatively easy to install without redesign of the mold This parting line micro-gap distance is proportional to an average force exerted by the melt, which is striving to drive apart these mold plates, which are held together by the clamping force of the molding machine. This technology has been commercialized recently by K-Tron, a subsidiary of Kodak. See 1988 SPE ANTEC paper reference. However, even this new indirect method of cavity-melt-pressure and density prediction still has limitations:

1. The proximity-sensed micro-gap at the parting line due to the melt pressure can be exceeded by an order of magnitude by the changes in temperature which occur from a mold at room temperature as compared to the same mold at its elevated operating temperatures. In other words, the signal-to-noise ratio is potentially very suspect unless very good compensation is made for these thermal expansion characteristics of the mold.

2. In a multi-cavity moldset, the parting line micro-gap represents the sum of the individual cavity melt pressures exerted against the mold clamping force, and there is no way to determine thereby such forces acting in individual cavities. Most specifically, there is no insight given into the possible imbalance which can exist from an individual cavity to another individual cavity, and since such information is not available, it is not possible thereby to use this generally predictive technique for problem-solving in correcting for cavity imbalance.

Furthermore, if an erroneous setup allows more than a slight excess of plastic to be injected, the resulting overfill causes flashing to occur, which can cause mold damage if undetected.

Another interesting technique monitors the melt pressure in an anticipatory fashion before the mold cavity is fully filled, by means of measuring upstream within the runner system the instantaneous changes in melt pressure, which would then plot out as a melt-pressure waveform versus time. This observed waveform is compared to a reference waveform, to give a predetermined change in molding machine setup, specifically the change in clamping force applied to the moldset to compress and further densify the injected plastic melt within the mold cavity. These are the Technoplas references:

(1) European patent application No. 0128722, on their application #84303756.5, filed Jun. 6, 1984
(2) European patent application No. 0130769, on their application #84304290.4, filed Jun. 25, 1984.

However, it doesn't help monitor and correct for cavity-to-cavity imbalance in a multicavity moldset, nor protect against flashing if more than slight overfill were to happen. Also, these teachings of Technoplas clearly are limited to single-cavity molding in that, even though individual cavity melt-pressure waveforms could be sensed, only one setting for the machine clamp can be chosen, which will then act equally upon all.

SUMMARY OF THE INVENTION

Conventional injection molds made of conventional tool steel components whose resiliency or elasticity is at least one or two orders of magnitude lower. These conventional substantially rigid moldsets adequately assure final molded-part thickness to be within specification tolerances, provided that enough plastic is injected into the mold cavity to 100% volumetrically fill these conventional substantially rigid mold cavities. However, proper packing to a desired melt density and pressure to compensate for the cooling process shrinkages is not assured. Thus, normal process variations and cycle-to-cycle reproducibility problems show up in degree of mold packing (and consequently in imprecise replication of surface contour and micro-finish), while maintaining essentially constant the part thickness.

In contrast to that conventional state of arts is the "adaptive" mold cavity of the present invention, which employs a predetermined degree of resiliency in at least one side of the parting line within the moldset, whereby the melt's internal pressurization and densification during mold packing is obtained within a predetermined range of acceptable values, while cycle-to-cycle variations produce a corresponding change instead in the molded-part thickness, provided that the following necessary and sufficient conditions are met:

1. On either the stationary or movable halves of the moldset, there must be a resilient member interposed between the part-forming mold insert surface and the associated clamp plate for that half of the moldset. Yet, like a conventional moldset, this "adaptive" mold's clamping force is still transmitted through the mold clamp plate to the mold insert, and conversely, force transmitted by the cavity's contents—the molten plastic's exerted pressure —pushing internally against the opposing mold inserts' partforming surface, is further transmitted back to the corresponding mold clamp plate. This path of mechanical support and force transmission must contain a resilient member, preferably such as a steel mechanical spring but also could be an elastomeric polymer of known and predetermined modulus, or a hydraulic or pneumatic cylinder.

2. When the mold is initially closed but not filled, there exists a first position having a first separation distance between the stationary-half and movable-half mold inserts, and this first separation distance is equal to or less than the molded product's specification value for minimum acceptable part thickness.

3. At least sufficient volume of injected plastic melt must enter the adaptive mold cavity to cause at least some deflection of the resilient member toward its corresponding clamp plate, to assure that the resulting molded-part thickness will be somewhere between minimum and maximum thickness tolerances. This second position of the opposing mold inserts corresponds to a second separation distance which must also be less than or equal to the maximum acceptable molded-part thickness under the product specification. At maximum acceptable volume of the injected melt, the resilient member is still incompletely compressed and doesn't bottom out.

If enough excess volume of injected plastic melt enters the adaptive mold cavity, it will cause no further deflection of the resilient member (i.e. bottoming out). This can cause an overpacked condition. This condition can be easily detected because this opposing mold inserts' third separation distance must also be greater than the maximum acceptable molded-part thickness under the product specification.

4. Within that minimum and maximum thickness range, variations in melt volume or packing pressure will cause changes in the deflected-cavity positional displacement and correspondingly in cavity volume, (thus resulting in changed molded-part thickness and mass). Yet, in spite of cycle-to-cycle variations (or even cavity-to-cavity variations in multicavity molding) in the molding process, the resulting melt density and pressure during packing and cooling stages of the molding cycle will stay inside the acceptable range.

In other words, the mold cavity is "adaptive". After the injected melt causes deflection of the resilient member, a self-actuating equilibrium is again restored, as follows:

a. the injected melt pushes upon the adaptive cavity's partforming surface
b. the resilient member is partially compressed, within the previously-defined range of deflection
c. each increment of deflection increases the volume occupied by the injected melt and correspondingly drops its melt pressure, while increasing incrementally the opposing "spring" force (exception: certain hydraulic cylinder embodiments shown later)
d. as a result, the applied mold packing force exerted by the melt declines until it now equals the opposing resilient member's increased "spring" force
e. at which point the rearward deflection "stalls out" (without having "bottomed out" against a mechanical hardstop)
f. as time passes and the melt cools, the resulting volumetric shrinkage causes the resilient member to recover gradually part (but not all) of its uncompressed length This adaptive cavity's proper self-adjusting performance is verified by means of a high-resolution, low-travel position-sensing device, most preferrably, an LVDT (Linear Variable Differential Transformers), whose output is available in realtime, so that the molded part's surface quality can be predicted even before the mold opens.

The preferred apparatus employs a suitable LVDT chosen for its substantially linear response and combines with a pre-loaded spring (or equivalent), to give a calculated range of deflection corresponding to no greater than the maximum part-thickness tolerance specified. The LVDT is positioned within the path of force transmitted between the mold clamp plate and the mold insert, such that the LVDT, an electromechanical transducer that produces an electrical output proportional to displacement of a separate movable core relative to a fixed positional coil structure, functions as an essentially frictionless device, for minimum wear.

BRIEF DESCRIPTION OF THE DRAWINGS

Referring to the drawings, wherein like numerals refer to like parts throughout the several views.

DETAILED DESCRIPTION OF THE PRESENT INVENTION

Figure 1:
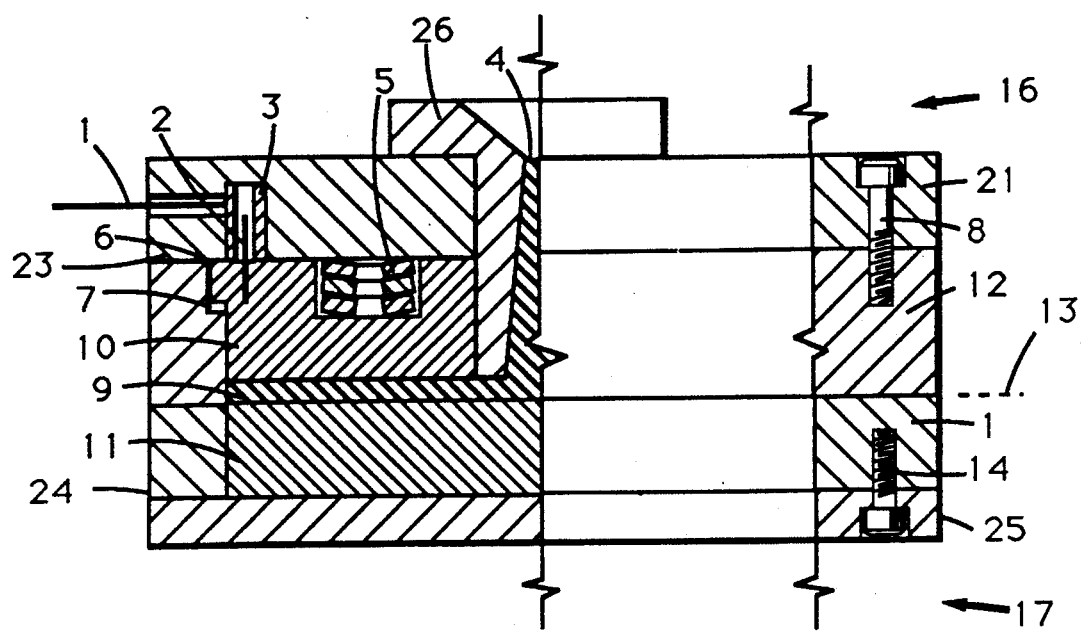
FIG. 1 shows a crosssectional view of a moldset of the present invention, showing as a preferred embodiment for the resilient member a stack of belleville springs interposed between the insert and mold clamp plate.

Refer to FIG. 1. A single cavity moldset is shown in sectional view, wherein clamping forces are supplied by the injection molding machine (not shown) through the stationary platen (16) and movable platen (17) to the stationary half (12) of the moldset and movable side half (15) of the moldset through clamp plates (21) and (25)

which are rigidly mounted onto the stationary platen (16) and movable platen (17) respectively, in order to hold closed the moldset's parting line (13). A mold cavity is formed by two opposing mold inserts (10) and (11) whose inward-facing surfaces will be wetted by the incoming plastic melt (4) entering the mold cavity through sprue bushing (26) and onto whose surfaces the plastic part (9) ultimately will be formed. A first mold insert (10) surface is located on the stationary half of the mold parting line (13) of the moldset and a second mold insert (11) surface is located on the movable half of the parting line (13) of the moldset.

When the mold is closed and ready for injection to start, these first (10) and second (11) mold insert surfaces are in a first position, and are separated by a predetermined first distance which is equal to or slightly less than the sum of the desired final part thickness, measured at room temperature, plus a thermal shrinkage factor characteristic of that particular plastic. This first distance takes into account the preload applied to resilient member (5) by means of its settable compression (determined by the degree to which shoulder bolt (8) is tightened during assembly of stationary half (12).)

For purposes of clarification, before assembly into (12), resilient member (5) has a first free length L1, and after assembly it's preloaded to a second, somewhat shorter length L2. Throughout this application, the terms "uncompressed", "partially compressed" and "fully compressed" are used to means as follows:

1. "uncompressed" refers to the preloaded condition, length L2, before injection takes place or before enough melt volume is in the cavity to force some deflection
2. "partially compressed" refers to that intermediate state of deflection between 1. and 3., and its length L3 is any value between L2 (maximum) and L4 (minimum)
3. "fully compressed" refers to the state of such full melt volume loading of the mold cavity that the resilient member is bottomed out against the rigid supporting structure, and any additional loading will not cause any further deflection. L4 is this length, which is its smallest value.

This first mold insert's (10) part-forming surface is a second distance away from its corresponding stationary-half clamp plate face (23), and the second mold insert's (11) part-forming surface is a third distance from its movable-half clamp plate face (24). At least one of these two distances is capable of being measurably shortened in direct proportion to the plastic's (9) melt volume and its corresponding melt- pressure- applied load exerted upon the insert's part-forming surface by means of a resilient member (5) interposed between the mold insert's part-forming surface and its corresponding mold clamp plate, with all other mechanical elements therebetween being of a conventional rigid construction. As shown in FIG. 1, only the first mold insert (10) is so provided, with the second mold insert (11) being of fixed and conventional design and construction. (It would be obviously possible to implement such resilient member's assemblies on both halves of the moldset, but such would have no advantages and would be a less preferred embodiment due to its redundant parts and more complicated monitoring scheme).

Once a sufficient volume of plastic melt has been injected into the closed mold cavity of the present invention so that the injected volume at that melt temperature exceeds the volume of the closed mold cavity when empty (but is still insufficient to completely compress and bottom out the resilient member), then this injected melt volume exerts a load upon the part-forming mold insert surfaces. This causes the first mold insert (10) surface to be deflected to a second position which is now further from the opposing insert's surface than the first distance defined earlier and which also is closer to its corresponding mold clamp plate than the second distance defined earlier. All this happens by partially compressing resilient member (5) proportionately to the exerted load. For a steel mechanical spring as shown in FIG. 1, the specific amount of deflection for any given load applied by the plastic is a function of the chosen spring and its applied pre-load.

In other words, the volume occupied by the part (9) will be at its maximum when just fully filled and packed, at which time the plastic's temperature will start to decline, as will its occupied volume and correspondingly its melt pressure exerted against the mold inserts' inward-facing part-forming surfaces. As time passes and cooling continues, the plastic melt shrinks volumetrically and solidifies, bringing the opposing mold inserts to a third position which is closer together than the second position just previously defined, and which allows the resilient member to recover some of its length from the previous second position. As this thermal shrinkage is proceeding, starting with that plastic in direct contact with the mold inserts' surface and progressing inward to the warmer core, it is absolutely essential to not allow the plastic to shrink away from these part-forming surfaces and thus lose contact with these surfaces before the solidifying plastic is fully set. Only in this way can the mold inserts' precise surface finish and contour be assured of being replicated onto the plastic part.

Since optical lenses and disks require very excellent surfaces, a high melt pressure in the mold cavity is needed for such surface replication. That required minimum melt pressure varies, depending upon factors of polymer chain mobility (including mold & melt temperatures and intrinsic viscosity of the selected plastic) and % shrinkage, among others. A general guideline for many different such combinations would be for the average melt pressure exerted over the part-forming surface to be at the very minimum 1000 psi, preferably above 2000 psi and most preferrably above 3000 psi. No sure maximum value exists, but above 5000 psi it takes great clamping forces to hold the parting line closed and to prevent flashing, so the injection molding machine must be larger in clamp tonnage and therefore more expensive. Also, running higher than needed clamp force is hard on the machine and is energy-inefficient. Any such average values above 10,000 psi are impractical for any plastic part configuration of substantial projected surface area.

Given the average melt pressures, the resilient member's resisting "spring" force can now be calculated, since the two forces must become equal at the point where no further rearward deflection occurs (assuming that the spring is not allowed to be mechanically bottomed out). Thus, for example, a spectacle lens having a projected area measured at the parting line of 7 square inches with a desired average melt pressure of 3,500 psi requires a minimal spring force of 24,500 lbs. within the allowable range of deflection. This spring force of greater than 12 tons must be available, in this lens example, with a spring deflection of less than 0.004 inches, or the lens will exceed allowable thickness. Therefore, springs of a compact design with very high spring forces are generally desired.

In general, many types of mechanical springs could be considered, including steel types and organic elastomer type springs. Coil steel die springs are widely used in moldsets. However, in this application, their spring force per unit of space volume occupied is generally lower than optimum.

Belleville disk springs, sometimes called spring washers, are therefore a preferred type of resilient member, usually in a multi-spring stack assembly as shown in FIG. 1's resilient member (5). One commercial source is Key Bellevilles Inc. of Leechburg, PA.

Further, it is very desirable to apply a pre-load to the spring assembly. This can accomplished in many ways well known to the art. One such way is shown in FIG. 1. For example, the product thickness tolerance range for an audio compact disk is 0.048"+ or −0.004", so the total allowable deflection is <0.008". This 0.008" is then added to the nominal machined depth cut into "A" insert support plate (12) to equal the height of "ears" on the backside of mold insert (10). So, if the ears are 0.500" high, the depth of cut into "A" insert support plate (12) must be 0.508". Then, when plates (12) and (21) are assembled with insert (10) and spring (5), the reduction of spring (5)'s first length L1 to its second, preloaded length L2 (previously defined) is maintained by threaded shoulder bolt (8).

One alternative to steel mechanical springs, which eventually fatigue after many molding cycles (of load and unload), include elastomeric polymers, most particularly those reinforced grades of high modulus and good heat resistance and low hysteresis.

Figure 2:
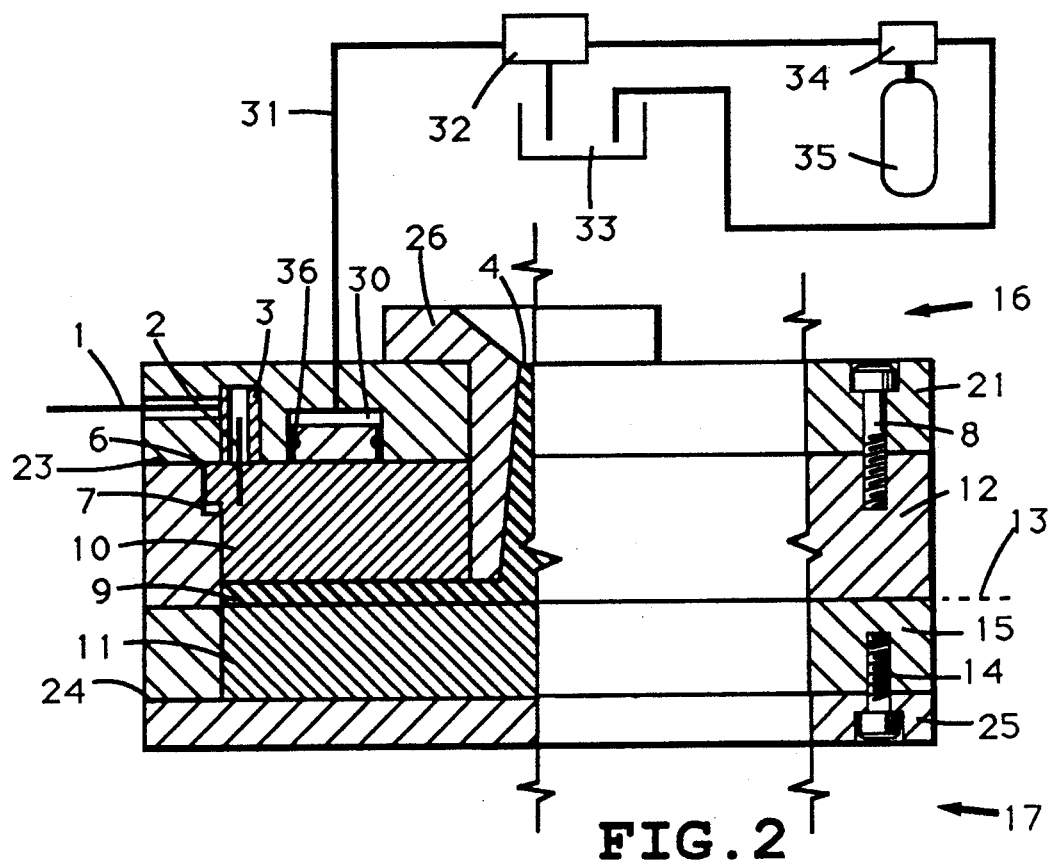
FIG. 2 shows a crosssectional view of a moldset of the present invention, showing as a preferred embodiment for the resilient member a hydraulic cylinder interposed between the insert and mold clamp plate.

Another alternative would be a hydraulic cylinder assembly, as shown in FIG. 2. It shows a hydraulic cylinder (fitted with seal (36)) as the resilient member (5), which is maintained in fluid communication (by conventional plumbing pipes (31)) with pressure reducing valve (32), whose function is to maintain a desired constant pressure value on the cylinder, by diverting excess to tank (33), from which also is drawn fluid by pump (34) driven by motor (35). Pancake cylinders have compact size, sufficient force and strokelengths, and are a particularly preferred type, widely commercially available. A similar function can be done by pneumatic cylinders, of which a recent variation uses nitrogen gas in a compact cylinder design is perhaps best, but in general they offer less spring force per unit space volume, so are less preferred.

In general the hydraulic cylinder functions similarly to the steel mechanical springs, but differing in being settable to maintain a constant resistive force throughout its permissable range of rearward deflection, whereas even the stiffest springs with preload gain in resistive force for each increment of rearward deflection. This provides for the greatest precision in assuring a reproducible melt pressure for cavity packing in spite of cycle-to-cycle injection molding variations which will then produce variations in part thickness but virtually no variation in melt packing.

However, disadvantages are:
1. risk of oil leakage from the cylinder, which might migrate to the partforming surfaces—this is a disaster for any optical plastic moldings and a major problem to any parts with critical surface quality—the very type which can most benefit from the present invention.

2. much greater complexity, more to buy and maintain.
3. whereas the steel or elastomeric springs are self-actuating once set up, the hydraulic circuit needs to be frequently monitored and adjusted for proper working.

Any of these embodiments of resilient member (5) will allow for a greater margin for melt volume overfill error, when compared to a conventional rigidly constructed mold cavity, and thus accomodate more process variation before allowing the mold to be flashed. This is especially important in minimizing multicavity imbalance problems.

Figure 3A:
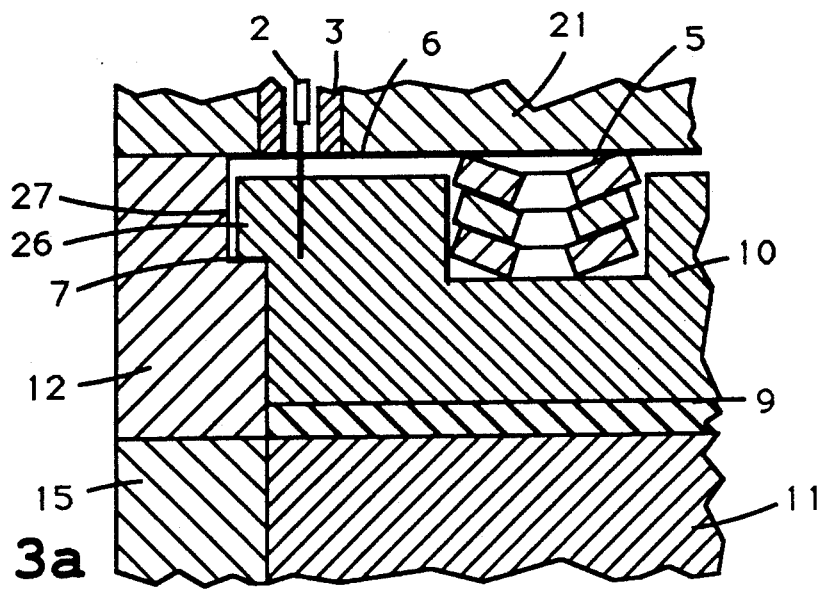
FIG. 3a shows a detailed portion of the crosssectional view of a moldset of the FIG. 1 type, wherein the pre-loaded assembly is not yet deflected rearward, as might be the case when either injection step has not yet started or else insufficient plastic volume has been injected.
Figure 3B:
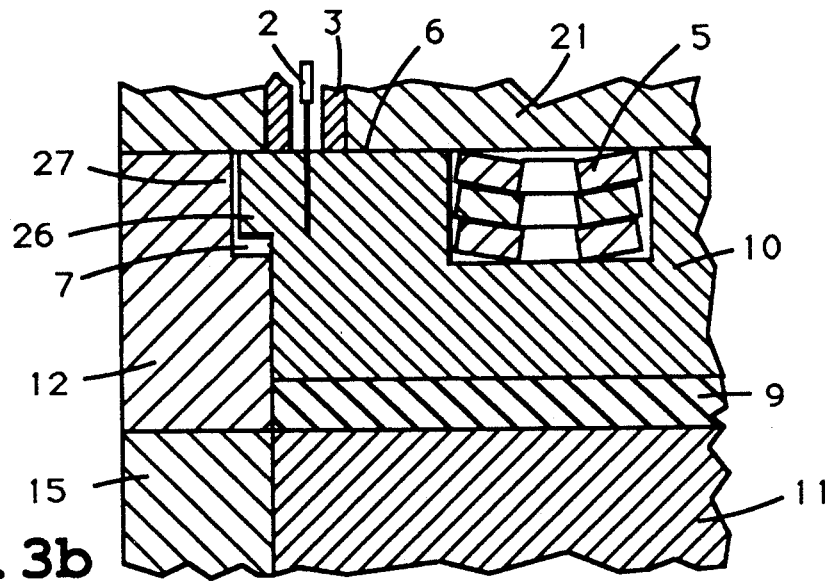
FIG. 3b shows a detailed portion of the crosssectional view of a moldset of the FIG. 1 type, wherein the pre-loaded assembly is fully deflected rearward, as might be the case when excessive plastic volume has been injected.
Figure 3C:
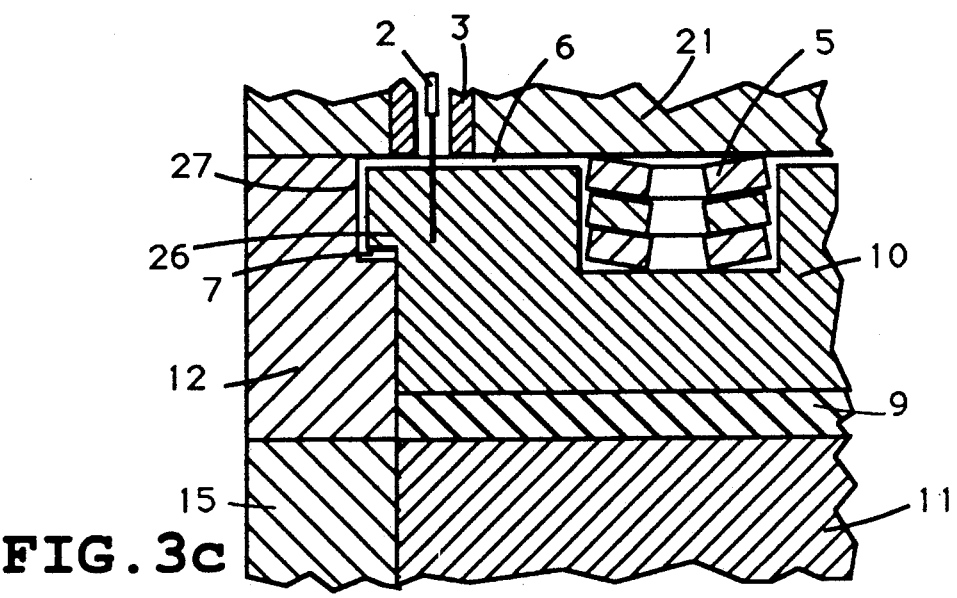
FIG. 3c shows a detailed portion of the crosssectional view of a moldset of the FIG. 1 type, wherein the pre-loaded assembly is optimally deflected rearward, as might be the case when fully sufficient but not excessive plastic volume has been injected.

FIGS. 3a, 3b and 3c show the extremes of operating latitude of the present invention, with belleville springs chosen as the resilient member. FIG. 3a shows a just slightly "partially compressed" condition, with just enough melt volume in the cavity to force some deflection, creating a small gap (7) compared to a much larger gap (6). (In all examples, the maximum permissible thickness tolerance is the sum of gaps (6) and (7), as discussed earlier regarding setting preload). The resulting part will be barely within specification, but on the thin side of target value.

FIG. 3b shows a nearly "fully compressed" condition, with more than enough melt volume in the cavity to force the desired deflection, as shown by very unequal gaps (7) and (6). The resulting part will be barely within specification, on the very high side of target value. It has such full melt volume loading of the mold cavity that the resilient member is nearly bottomed out against the rigid supporting structure.

FIG. 3c shows a midrange "partially compressed" condition, with enough melt volume in the cavity to force the desired deflection, as shown by nearly equal gaps (7) and (6). The resulting part will be centered within specification, right on target value. In each example, the size of gap (6) is sensed by position sensor assembly (shown here as an LVDT with fixed coil (3) and moveable core (2)).

The placement of the LVDT should correspond to an initial position when the mold is closed but empty, and a final position when the mold insert has been deflected rearward under maximum melt pressure within the mold cavity. Referring again to FIG. 3, the LVDT device translates this change in the relative position of its fixed coil (3) (shown rigidly attached to clamp plate (21)) and movable core (2) (shown rigidly attached to mold insert (10)) within it into a certain AC or DC voltage signal transmitted down output lead wire (1). This voltage signal, in turn, can be simply read for relative comparison purposes on a voltmeter.

Or, most preferably, for statistical process control means, the LVDT voltage output can be translated into a digital output, by means of signal conditioning electronic circuit boards well known to the art, and entered into microcomputer data files upon which X-bar ("average") and R ("range") values and standard deviations can be calculated, in order to measure process stability and capability. This LVDT output information can be easily displayed in digital form or displayed graphically upon such micro-computers as IBM PC-AT to show the well-known calculated control limits and moving averages or histograms of a series of successive mold cycles with respect to actual deflection which corresponds to a "peak packing" pressure of the melt exerted, on average, across the mold insert surfaces. Such a PC-based system using mold-implanted sensors is described in the co-inventors' technical paper (and block diagram therein) published in the Conference Proceedings of the Society of Plastics Engineers 46th Annual Technical Conference, pp. 1657-9.

Such LVDT products are commercially available from Schaevitz Engineering of Pennsauken, N.J. LVDT's combine the virtue of mechanical compactness and durability with very high resolution of small incremental positional changes. Other types of position-sensing devices occupy considerably greater space or have a less-durable service life in the rugged heat and mechanical-force environment within an injection molding moldset, but could conceivably include linear potentiometers or rotary encoders.

Thus, referring to FIG. 1, a LVDT measures the deflection (see gap (6) measured between the back surface of first mold insert (10) and a "reference" front surface of mold clamp plate (21)) as follows:

first, when the mold cavity is empty (not shown), and the mold insert (10) is in its first, undeflected position, the relative positions of fixed coil (3) and movable core (2) are defined as "zero deflection" (or "adjusted to zero" LVDT output voltage).

second, when the plastic part (9) is occupying its maximum volume, then the mold cavity is at its fullest, and the mold insert (10) is in its second, deflected position, gap (6) is now changed accordingly, the average melt pressure is exerting its maximum load onto the part-forming surfaces, and the LVDT gives its peak output voltage.

All this is accomplished without leaving any surface mark onto the molded part, unlike other prior art means. Functionally equivalent to the LVDT would be other position-sensing electronic devices like rotary encoders or linear potentiometers or such mechanical gap-measuring devices like a dial indicator mounted at gap (6) and read out on each cycle (certain digital dial indicators such as made by Mitutoyo can also electronically datalog these measurements automatically now). Even cruder but another possible functional equivalent method would be to use the "partially compressed" springs in the moldset (not allowed to bottom out like Johnson) but not measure deflection directly within the moldset but rather indirectly, by measuring relative change in part weight or thickness outside the moldset.

So, using the LVDT output information, a suitably scientifically-based change in injected melt volume may be made in a future molding cycle to optimize molded part thickness within a specification tolerance range and to simultaneously optimize micro-contour and micro-finish of the molded part surface with respect to precise replication of these first and second mold insert part-forming surfaces.

EXAMPLE

Use in Multicavity Injection Mold

A specific application of the above is for multicavity molds, wherein each cavity is of the type shown in FIG. 1 or FIG. 2, and each cavity being fed melt by any of the various conventional runner and sprue systems well known to the art.

"Cavity imbalance" means the mass of melt injected into each cavity is not exactly equal. It can be caused by slight variations in the runner system's metal temperature or surface smoothness (which alter the melt's viscosity and impedance to flow), or slight geometric and dimensional variations (which change the orifice shape offered to the melt). The first step in correcting imbalance is to be able to measure it. The present invention does that, as discussed above, with each individual cavity's melt volume and corresponding spring deflections being available for readout in numerous forms.

As shown by FIGS. 3a-3c, a considerable variation between cavities is possible, and within these range of conditions:

1. the product of each cavity will still meet thickness and surface quality tolerances, 2. the cavity deflection of each cavity is easily measured, then compared to "nominal" (FIG. 3c), and the magnitude of this deviation determines the corrective action taken (if needed)

3. to correct this measured imbalance, the easiest way to change the amount of melt entering a given cavity is to increase or decrease flow impedance in that leg of the runner system which feeds the cavity, by a variety of well-known means. Perhaps the most popular is simply to turn up the metal temperature in that leg of the mold, if underfill is the problem (or, if overfilling, turn it down). Another way is to change the flow restrictions in a mechanically adjustable gating design, also well known. An example of the latter is given in Applicants' U.S. Pat. No. 4,828,769 among others.

So, as long as the range of cavity-to-cavity imbalance doesn't exceed the conditions of FIG. 3a (underfilled relative to nominal) on one hand, and of FIG. 3b (overfilled relative to nominal) on the other hand, the resulting operations (which coincide with the range of permissible operations for the present invention) will be both self-adaptive (more resistant to flash than conventional multicavity molds) and self-monitoring (provide quantitative data on each cavity's state of fill before the mold is opened and parts are ejected).

As an example, a 4-cavity mold for polycarbonate audio compact disks was fitted in each of its 4 cavities as shown in FIG. 3 with an LVDT (Schaevitz model 050DC-D) and a stack of 3.250" O.D., 0.600" thick, 0.020" dish) belleville 6150 steel springs into a precisely machined pocket between the partforming insert and clamp plate, and a certain preload was applied by tightening, such that an additional 0.0025" rearward deflection required a force of about 35,000 lbs. acting on the partforming surface of the insert. This deflection is easily monitored by the LVDT and it corresponds to an average pressure of 2000 psi acting within the individual mold cavity by the molten plastic. This "moldpacking" pressure has been shown to be minimally sufficient to precisely replicate the tiny (0.3 microns deep, 1 micron long) pits which give the disk its playable signal.

Therefore, by watching each LVDT in each of the 4 cavities, the degree of proper packing can be assured as well as monitoring the degree of cavity-to-cavity equality or balance. The disk's nominal thickness is 0.047+ or −0.004". The first position of the A-B mold inserts was set so that the preloaded-and-assembled closed but empty mold (before injection of plastic) first separtion distance was just less than 0.0445". So, as long as each cavity shows a deflection of at least 0.0025" on its LVDT, the molded disk will be near the nominal thickness and will be sure to have been at least minimally sufficiently well-packed to give good pit surface replication. Yet if one cavity were to be imbalanced and receive as much as 1.0 gram greater weight of plastic (on a nominal 16 grams part weight, or 6.25% excess) into it, because of the resiliency of the spring, the cavity will "adapt" and will not "flash" (i.e. spill the excess out at the parting line). Because the greater rearward deflection is nonlinear, the melt density of the excess-filled cavity will be higher than the other cavities, in addition to forming a thicker disk still within specification.

We claim:

1. An injection molding method of producing plastic molded products having consistently high replication of at least one partforming surface of an adaptive mold cavity enclosed within a moldset wherein first and second opposing mold insert partforming surfaces are wetted by an injected plastic melt, the first mold insert surface located on a stationary half of the moldset and the second mold insert surface located on a movable half of the moldset, the first and second mold insert surfaces forming the mold cavity having a first volume, the first and second mold insert surfaces being separated in a first position by a predetermined first distance which is slightly less than a sum of a desired final part thickness measured at room temperature plus a thermal shrinkage factor characteristic of the plastic, the first mold insert surface being separated a second distance away from a stationary-half clamp plate, and the second mold insert surface being-separated a third distance from a movable-half clamp plate while the first and second mold insert surfaces are still in the first position, at least one of the second and third distances being measurably shortened in direct proportion to a melt volume of the injected plastic melt, wherein a resilient member is interposed between at least one of the first and second mold insert surfaces and its clamp plate, the resilient member having a length L2 when mounted in the moldset with inserts in the first position and having a length L4 when fully compressed, and a spring constant which determines its relationship of length to force is unchanged throughout the molding cycle for the resilient member, the method comprising the steps of:

a. injecting a greater volume of plastic melt than the first volume into the mold cavity in the first position to partially compress the resilient member to a length L3 which is less than the length L2 but greater than the length L4, at which length L3 the melt packing force onto the second insert equals the opposing spring force of the resilient member;

b. holding within the mold cavity substantially all the injected volume and cooling the plastic melt to solidification, thereby reducing its volume and melt packing force, causing reduction in spring force and increase in length, until the moldset is opened for ejection.

2. A method of claim 1 wherein a deflection of the resilient member is measured by means of a position-sensing device and wherein said measuring step comprises comparing the deflection relative to a certain reference surface established adjacent to said resilient member under compression within the moldset, said measured deflection corresponding to a reduced distance between said mold insert surface and said mold clamp plate, but said measured deflection does not cause a change in the constant relationship between resilient member's length and force within the molding cycle.

3. A method of claim 2 further comprising the step of displaying electronically the measured deflection.

4. A method of claim 1 wherein the injected melt volume within the mold cavity exerts at least 1000 psi and less than 10,000 psi upon said opposing mold insert surfaces.

5. An injection molding method of producing plastic molded products having consistently high replication of at least one partforming surface of each of a plurality of adaptive mold cavities enclosed within a multicavity moldset wherein a plurality of first and second opposing mold insert partforming surfaces are wetted by an injected plastic melt, each of the first mold insert surfaces located on a stationary half of the moldset and each of the second mold insert surfaces located on a movable half of the multicavity moldset, the first and second mold insert surfaces forming the plurality of mold cavities each having a first volume, the first and second mold insert surfaces being separated in a first position by a predetermined first distance which is slightly less than a sum of a desired final part thickness measured at room temperature plus a thermal shrinkage factor characteristic of the plastic, each of the first mold insert surfaces being separated a second distance away from a stationary-half clamp plate, and each of the second mold insert surfaces being separated a third distance from a movable-half clamp plate while the first and second mold insert surfaces are still in the first position, at least one of the second and third distances being measurably shortened in direct proportion to a melt volume of the injected plastic melt, wherein a resilient member is interposed between at least one of the first and second mold insert surfaces and its clamp plate for each cavity, the resilient member having a length L2 when mounted in the moldset with inserts in the first position and having a length L4 when fully compressed, and a spring constant which determines its relationship of length to force is unchanged throughout the molding cycle for the resilient member, the method comprising the steps of:

a. injecting a greater volume of plastic melt than the first volume into each of the plurality of mold cavities in the first position to partially compress the resilient member to a length L3 which is less than the length L2 but greater than the length L4, at which length L3 the melt packing force onto the second insert equals the opposing spring force of the resilient member, and;

b. holding within each of the mold cavities substantially all the injected volume and cooling the plastic melt in each cavity to solidification, thereby reducing its volume and melt packing force, causing reduction in spring force and increase in length, until the multicavity moldset is opened for ejection.

6. An injection molding method of producing plastic molded products having consistently high replication of at least one partforming surface of an adaptive mold cavity enclosed within a moldset wherein first and second opposing mold insert partforming surfaces are wetted by an injected plastic melt, the first mold insert surface located on a stationary half of the moldset and the second mold insert surface located on a movable half of the moldset, the first and second mold insert surfaces forming the mold cavity having a first volume, the first and second mold insert surfaces being separated in a first position by a predetermined first distance which is slightly less than a sum of a desired final part thickness measured at room temperature plus a thermal shrinkage factor characteristic of the plastic, the first mold insert surface being separated a second distance away from a stationary-half clamp plate, and the second mold insert surface being separated a third distance from a movable-half clamp plate while the first and second mold insert surfaces are still in the first position, least one of the second and third distances being measurably shortened in direct proportion to a melt volume of the injected plastic melt, wherein a resilient member is interposed between at least one of the first and second mold insert surfaces and its clamp plate, the resilient member having a length L2 when mounted in the moldset with inserts in the first position and having a length L4 when fully compressed, and the resilient member is maintained at a constant pressure and spring force state throughout the molding cycle, the method comprising the steps of:
a. injecting a greater volume of plastic melt than the first volume into the mold cavity in the first position to partially compress the resilient member to a length L3 which is less than the length L2 but greater than the length L4, at which length L3 the melt packing force onto the second insert equals the opposing spring force of the resilient member, and;
b. holding within the mold cavity substantially all the injected volume and cooling the plastic melt to solidification, thereby reducing its volume and melt packing force, causing reduction in spring force and increase in length, until the moldset is opened for ejection.

7. A method of claim 6 wherein the moldset is a multi-cavity moldset having a plurality of cavities.

8. A method of claim 6 wherein a deflection of the resilient member is measured by means of a position-sensing device and wherein said measuring step comprises comparing the deflection relative to a certain reference surface established adjacent to said resilient member under compression within the moldset, said measured deflection corresponding to a reduced distance between said mold insert surface and said mold clamp plate, but said measured deflection does not cause a change in the constant relationship between resilient member's length and force within the molding cycle.

9. A method of claim 8 further comprising the step of displaying electronically the measured deflection.

10. A method of claim 6 wherein the injected melt volume within the mold cavity exerts at least 1000 psi and less than 10,000 psi upon said opposing mold insert surfaces.

11. An Apparatus for producing plastic molded products having consistently high replication of at least one partforming surface of an adaptive mold cavity improving product surface quality and process control in a plastic injection molding process, of the type having a moldset having a parting line with a stationary half with a first clamp plate fixedly mounted to a stationary platen of an injection molding machine and a movable half with a second clamp plate fixedly mounted to a movable platen of said injection molding machine, said moldset further comprising:
a. a first and second opposing mold insert surfaces which are wetted by an incoming plastic melt, the first mold insert surface located on the stationary half of the moldset and the second mold insert surface located on the movable half of the moldset, the first and second mold insert surfaces forming the mold cavity closed against overflow of injected melt and having a volume in a first position wherein said first and second mold insert surfaces are separated by a predetermined first distance which is slightly less than the sum of a desired final part thickness measured at room temperature plus a thermal shrinkage factor characteristic of the plastic, and said first mold insert surface is a second distance away from its corresponding stationary half clamp plate, and said second mold insert surface is a third distance from its movable half clamp plate;
b. at least one resilient member, wherein at least one of said first and second mold insert surfaces is cooperatively connected to at least one of said corresponding clamp plates by said resilient member, and wherein injecting a volume of plastic melt at the injecting melt temperature into said mold cavity exceeds said mold cavity volume when empty, but said injected volume is insufficient to fully compress said resilient member, and wherein said injected melt volume exerts load upon said first and second mold insert surfaces which are now in a second position, whereby at least one of said mold-insert surfaces is deflected toward at least one of said corresponding clamp plates, thus reducing said distance separating said mold insert surfaces from said corresponding clamp plate, by partially compressing said resilient member proportionately to said exerted load.

12. An Apparatus of claim 11 further comprising means for measuring the deflection corresponding to said reduced distance between said mold insert surface and said corresponding clamp plate, wherein the means for measuring the deflection are a position-sensing device mounted within the moldset and wherein a measuring step comprises comparing the deflection relative to a certain reference surface located adjacent to said resilient member under compression within the moldset, said measured deflection corresponding to a reduced distance between said mold insert surface and said mold clamp plate.

13. An Apparatus of claim 12 wherein the position-sensing device is a Linear Variable Differential Transformer.

14. An Apparatus of claim 11 wherein the resilient member cooperatively connecting the mold insert surface with the clamp plate under some settable pre-load compression is at least one mechanical spring.

15. An Apparatus of claim 11 wherein the resilient member consists of at least one steel belleville disk spring.

16. An Apparatus of claim 11 wherein the resilient member is an elastomeric polymer spring.

17. An Apparatus of claim 11 wherein the resilient member is at least one hydraulic cylinder with associated fluid supply and pressure regulating means for applying a settable pressure, such that the minimum acceptable load exerted by the injected melt volume upon the partforming surfaces of the mold inserts is required in order to provide any measurable deflection.

* * * * *